United States Patent
Schultink et al.

(10) Patent No.: US 8,784,525 B2
(45) Date of Patent: Jul. 22, 2014

(54) VACUUM CLEANER FILTER BAG

(75) Inventors: Jan Schultink, Overpelt (BE); Ralf Sauer, Overpelt (BE)

(73) Assignee: Eurofilters Holding N.V., Overpelt (BE)

( * ) Notice: Subject to any disclaimer, the term of this patent is extended or adjusted under 35 U.S.C. 154(b) by 973 days.

(21) Appl. No.: 12/667,651

(22) PCT Filed: Jul. 3, 2008

(86) PCT No.: PCT/EP2008/005444
§ 371 (c)(1),
(2), (4) Date: Apr. 29, 2010

(87) PCT Pub. No.: WO2009/007055
PCT Pub. Date: Jan. 15, 2009

(65) Prior Publication Data
US 2010/0212273 A1    Aug. 26, 2010

(30) Foreign Application Priority Data
Jul. 6, 2007 (EP) .................................... 07013312

(51) Int. Cl.
*B01D 46/00* (2006.01)
(52) U.S. Cl.
USPC ................ 55/382; 55/486; 55/527; 55/528
(58) Field of Classification Search
None
See application file for complete search history.

(56) References Cited

U.S. PATENT DOCUMENTS

| | | | |
|---|---|---|---|
| 4,656,075 A | 4/1987 | Mudge | |
| 5,108,474 A * | 4/1992 | Riedy et al. | 55/485 |
| 5,306,534 A | 4/1994 | Bossess | |
| 6,156,086 A | 12/2000 | Zhang | |
| 2008/0257149 A1 * | 10/2008 | Ogale | 95/70 |
| 2009/0056548 A1 * | 3/2009 | Woo et al. | 95/287 |

FOREIGN PATENT DOCUMENTS

| | | |
|---|---|---|
| DE | 7 424 655 | 7/2003 |
| DE | 202 09 923 U1 | 7/2003 |
| EP | 0 246 811 A2 | 5/1987 |
| EP | 0 960 645 A2 | 5/1999 |
| EP | 1 048 335 A1 | 4/2000 |
| EP | 1 050 331 A1 | 4/2000 |
| EP | 1 795 248 A2 | 6/2006 |
| GB | 2 156 263 A | 10/1985 |
| JP | 6-30869 A | 2/1994 |
| WO | WO 97/40913 A1 | 11/1997 |
| WO | WO 9958041 | 11/1999 |

OTHER PUBLICATIONS

Definition of "netting" by Free Online Dictionary (dated Jul. 15, 2013) at www.thefreedictionary.com/netting.*
Krŏma, R.; "Textilverbundstoffe", pp. 189, 201, 205-209, 250-251; Leipzig: VEB Fachbuchverlag; 1963. (Translation included).

(Continued)

Primary Examiner — Duane Smith
Assistant Examiner — Pankti Patel
(74) Attorney, Agent, or Firm — Brinks Gilson & Lione

(57) ABSTRACT

The invention relates to a vacuum cleaner filter bag having a composite material comprising a first layer consisting of a netting or a perforated sheet with an air permeability of at least 10,000 $l/(m^2 \, s)$, and a first fiber layer consisting of man-made fibers and/or vegetable fibers and connected to one side of the first layer.

24 Claims, 1 Drawing Sheet

(56) References Cited

OTHER PUBLICATIONS

Brockhaus, F.A.; "Der große Brockhaus Sechzehnte, Völlig Neubearbeitete Auflage in Zwölf Bänden, Vierter Band Fba-Goz", "Gitterstoff"; Wiesbaden: F.A. Brockhaus; 1954. (Translation of relevant term included).

Wikipedia; "Textiltechnik (Seite der Wkipedia)"; Fundstelle: http://de.wikipedia.org/wiki/Gelege_(Textiltechnik); Jun. 21, 2010. (Translation included).

Yu, Xiaoling; "Study on the Structure and Properties of Vacuum Cleaner Filtering Material," Master thesis; Donghua University; Dec. 2005; 96 pages; Abstract translated.

International Search Report completed Dec. 5, 2008 for International Application No. PCT/EP2008/005444.

\* cited by examiner

VACUUM CLEANER FILTER BAG

This application claims the benefit under 35 U.S.C. §371 of International Application No. PCT/EP2008/005444, filed Jul. 3, 2008, which claims the benefit of European Patent Application No. 07013312.9, filed Jul. 6, 2007, which are incorporated herein by reference in their entirety.

The invention relates to a vacuum cleaner filter bag having a composite material, and in particular to a disposable vacuum cleaner filter bag.

The development in the field of vacuum cleaner filter bags aims at increasing the filtration performance and, simultaneously, the service life. To this end, conventional vacuum cleaner filter bags normally have a bag wall consisting of a plurality of filter material layers. The filter material layers are e.g. layers consisting of filter paper or of a non-woven (i.e. non-woven fabric). The various layers fulfil different demands. In addition to the layers providing the filtration performance, layers may be provided, which increase the service life (dust holding capacity) of the filter bag as well as layers fulfilling a protecting function (e.g. impact protection). In addition, layers are required which impart stability to the filter bag, without deteriorating the properties of use.

Various possible filter structure layouts are described e.g. in EP 0 960 645, where a coarse filter layer is arranged upstream of a fine filter layer in the air flow direction, so that larger particles will be trapped by the coarse filter layer, whereas smaller particles can be held in the fine filter layer. Although the hitherto used protection and backing layers are capable of imparting to the bag the desired bursting strength or to protect also sensitive filter layers against abrasion caused by the impact of particles, they are not free from drawbacks. They reduce the air permeability of the filter bag and, consequently, the maximum suction capacity of the vacuum cleaner. In order to protect sensitive layers of the bag material (e.g. a meltblown layer), comparatively compact protection layers must be used, and these layers themselves tend to become clogged with house dust. Some of the normally used backing or protection layers, such as paper, are not weldable and are therefore not suitable for use in modern plastic non-woven bags.

DE 202 09 923 discloses a dust filter bag having a perforated inner layer in the form of a perforated sheet or a netting. This perforated inner layer serves to protect subsequent filter layers against sharp-edged particles whose cross-section is larger than 100 μm. To this end, the perforations of the inner layer have a diameter of 100 μm.

A filter material including an air-permeable plastic film is known from EP 1 795 248, the plastic film fulfilling the function of a support layer and having a low permeability to air of e.g. 1200 l/(m² s).

A dust bag comprising an intermediate layer between two filter layers (e.g. a filter paper or a non-woven) is known from DE 201 10 838, the intermediate layer being used for establishing a separation between the filter layers, so that the filter layers can be displaced relative to one another.

Taking into account the prior art, it is the object of the present invention to provide a vacuum cleaner filter bag having a high mechanical stability without impairing the unfolding of the bag when the vacuum cleaner is in operation.

This object is achieved by a vacuum cleaner filter bag according to claim 1.

Accordingly, the present invention provides a vacuum cleaner filter bag having a composite material comprising a first layer consisting of a netting or a perforated sheet with an air permeability of at least 10,000 l/(m² s), and a first fibre layer consisting of man-made fibres and/or vegetable fibres and connected to one side of the first layer.

Surprisingly enough, it turned out that a vacuum cleaner filter bag having a bag wall comprising a composite material, which is made of such a first layer with a structure and an air permeability of the type in question and of such a first fibre layer, advantageously exhibits a high mechanical stability and good properties of use.

The man-made fibres (artificial fibres) can be staple fibres or endless fibres, sometimes also referred to as filaments. The vegetable fibres (natural fibres) can e.g. be cellulose fibres, in particular bamboo cellulose fibres.

The vacuum cleaner filter bag can be a disposable bag. The vacuum cleaner filter bag may especially be implemented in the form of a flat bag.

The netting may e.g. be an extruded netting or a woven netting.

The first fibre layer can be connected to the first layer in particular by a full-area connection, e.g. by means of a hot-melt. The two layers can therefore not be displaced relative to one another. In this context, full-area does not mean that all the fibres are fully connected to one another, e.g. fused with one another, whereby a film would be obtained, but it means that the layers are interconnected at a large number of discrete locations, said locations being uniformly distributed across the whole surface of the respective layers. These locations can be predetermined, e.g. in the case of a dot calender or an engraved calender, or not predetermined, e.g. in the case of hotmelt powder and a ribbon calender.

The first layer and the first fibre layer can especially be connected such that the structure of the first layer is not damaged, in particular not deformed. Thermal bonding by means of a smooth calender or a ribbon calender and bicomponent fibres, fusing fibres or a hotmelt will therefore be advantageous.

Through the bonding of the two layers it is achieved that the tensile strength elongation will be low. This will guarantee that the forces acting on the bag will be absorbed by the composite material and that excessive loads on other filtering layers will be avoided.

The first layer may have a mass per unit area of 5 to 30 g/m², in particular of 7 to 20 g/m², and/or a thickness of 0.1 to 1.5 mm, in particular of 0.2 to 0.6 mm. This allows sufficient flexibility in combination with high strength. If the first layer is provided in the form of a netting, this netting can especially have a mass per unit area of 5 to 30 g/m², in particular of 7 to 20 g/m². If the first layer is provided in the form of a perforated sheet, said perforated sheet may especially have a mass per unit area of 15 to 30 g/m².

The first layer can have an average hole cross-sectional area of 2 to 900 mm², in particular of 5 to 30 mm², and/or an air permeability of at least 11,000 l/(m² s), in particular of at least 13,000 l/(m² s), in particular of at least 15,000 l/(m² s).

The first layer can especially be a netting having a mesh opening of 2 mm to 30 mm. The mesh opening can be different or identical in different directions, e.g. in the x- and y-directions, i.e. in the machine direction and in the cross direction. The netting can be a rectangular, in particular a square netting. The mesh opening can especially be between 2×2 mm and 30×30 mm.

The first layer may have a tensile strength in the machine direction and/or in the cross direction of 30 to 200 N, in particular of 40 to 110 N, and/or a tensile strength elongation (breaking extension) in the machine direction and/or in the cross direction of 10 to 70%, in particular of 10 to 30%.

The first fibre layer of the composite material described can comprise fibres having a maximum fineness (linear density)

of 5 dtex, in particular of 3 dtex. The first fibre layer can especially consist of such fibres.

The above-mentioned parameters can especially be adapted to the size or the intended use of the vacuum cleaner filter bag. As regards the first layer, a mass per unit area of less than 15 g/m$^2$, a thickness of less than 0.5 mm and/or a mesh opening of less than 5 mm may perhaps be particularly suitable. This applies e.g. to household vacuum cleaners having comparatively small bags (volumes between 2 and 5 l). For vacuum cleaner bags intended for industrial use a greater mass per unit area and/or greater mesh openings may be of advantage.

The above-described composite materials may comprise a second fibre layer made of man-made fibres and/or vegetable fibres, said second fibre layer being connected to the first layer on the side facing away from the first fibre layer. The second fibre layer may especially be connected to the first fibre layer; in particular, fibres of the first fibre layer may be connected to fibres of the second fibre layer. Fibres of the first fibre layer may be connected to fibres of the second fibre layer especially in the holes, meshes or pores of the first layer. The first fibre layer, the second fibre layer and/or the first layer may be interconnected in such a way that they cannot be moved relative to one another, in particular not displaced relative to one another.

Also the second fibre layer may have the properties and parameters which have been described for the first fibre layer. The second fibre layer may, for example, comprise fibres having a maximum fineness of 5 dtex, in particular of 3 dtex. The properties and the parameters of the second fibre layer may, however, be chosen independently of those of the first fibre layer. The two fibre layers may, however, also be implemented in the same way.

The first and/or the second fibre layer in the above-described composite materials may be thermally bonded to the first layer and/or the respective other fibre layer, in particular by means of calendering, and/or by means of an adhesive. The calendering can be executed areawise (e.g. by means of a calender with smooth rollers or by means of a ribbon calender). The adhesive may be e.g. a hotmelt, in particular a hotmelt powder. Also other bonding methods, in particular those of a thermal nature, are possible.

The first and/or the second fibre layer can, especially before they are connected to the first layer, be implemented in the form of a web layer or a non-woven layer.

The term non-woven (i.e. non-woven fabric) is used in accordance with the definition according to the ISO standard ISO 9092: 1988 and the CEN standard EN 29092, respectively. A non-woven can especially be dry-laid or wet-laid or it may be an extruded non-woven, in particular a meltblown (meltblown microfibre non-woven) or a spunbond (filament spunbonded fabric). Wet-laid non-wovens are distinguished from conventional wet-laid paper according to the above-mentioned definition, which is also used by the International Association Serving the Nonwovens and Related Industries EDANA (www.edana.org.), i.e. when paper or filter paper is referred to in the present context it means (conventional) wet-laid paper, which is excluded in the above-mentioned definition of non-wovens. A web is a layer of fibres which are still loose, i.e. unconnected. A non-woven can then be obtained by compacting the loose fibres.

It follows that e.g. loose fibres (staple fibres, by way of example) can be deposited on a netting or a perforated sheet, and can then be connected thereto e.g. by means of calendering. The thermal bond is established either due to the fact that the netting comprises a bicomponent material or the staple fibres comprise bicomponent fibres; the respective other layer can then comprise a mono- or a bicomponent material. Alternatively or additionally, e.g. a hotmelt can be sprayed on for the purpose of bonding, or a hotmelt powder can be dispersed or interspersed. Separate compacting of the web layer is here not necessary. Hence, the fibre layer need not define a separate and stable filter layer; the necessary stability is only obtained in combination with the first layer (netting or sheet).

In particular, the first and/or the second fibre layer can be implemented in the form of a web layer or non-woven layer of staple fibres, said layers being especially carded layers. Fibres of the first and/or second fibre layer(s) can project into the holes or pores of the first layer.

The respective first and/or second fibre layer(s) can be a dry-laid or wet-laid web layer or non-woven layer, an extruded web layer or an extruded non-woven layer.

The materials that are adapted to be used for the fibres of the fibre layers and/or for the first layer are, in principle, a great variety of plastic materials; natural fibres, e.g. cellulose fibres, may be used as well. Possible materials are e.g. polypropylene or polyester. In addition, the first layer and/or the fibres of the first and/or second fibre layer may have a bicomponent structure. The use of bicomponent fibres in the first fibre layer or the use of e.g. a bicomponent netting, i.e. a netting whose fibres have a bicomponent structure, allows in particular easy thermal bonding of the first layer and of the first fibre layer. Alternatively or additionally, one fibre layer may comprise fusing fibres.

The first fibre layer and/or the second fibre layer can have a mass per unit area of 5 to 60 g/m$^2$, in particular of 5 to 30 g/m$^2$. Due to the netting, fibre layers having a low mass per unit area can be used, said fibre layers being sufficiently stabilized by the netting with a high air permeability and a low tendency to clog. When a first and a second fibre layer are provided, the masses per unit area of the first and of the second fibre layer can, independently of one another, lie between 5 and 30 g/m$^2$.

The above-described composite materials may comprise a third fibre layer consisting of man-made fibres and/or vegetable fibres, in particular in the form of a non-woven layer arranged on the first fibre layer on the side facing away from the first layer. Hence, the desired filtering characteristics can be adjusted by selecting the filter parameters of the various layers in a suitable manner.

The above-described composite materials may comprise a fourth fibre layer consisting of man-made fibres and/or vegetable fibres, in particular in the form of a non-woven layer arranged on the third fibre layer on the side facing away from the first fibre layer.

The first, second, third and/or fourth fibre layers may each consist of a dry-laid or wet-laid non-woven layer or an extruded non-woven layer of the type described exemplarily hereinbefore. The first, second, third and/or fourth fibre layers may, however, be implemented differently.

The composite consisting of the first layer and of the first fibre layer, or of the first layer, the first fibre layer and the second fibre layer can have an air permeability of 2,000 to 12,000 l/(m$^2$ s), in particular of 4,000 to 10,000 l/(m$^2$ s).

The composite material can be arranged at the furthest downstream location of the bag wall of the vacuum cleaner filter bag. The first layer or the first fibre layer can especially define the outermost layer of the bag wall of the vacuum cleaner filter bag. In this case, the first layer or the first fibre layer constitutes the furthest downstream layer of the vacuum cleaner filter bag when seen in relation to the air current. Especially when the described composite materials in the form of this composite are positioned at the outermost location, the filter bag will have a high stability and good properties of use. The composite material may especially extend across the whole area of the bag wall.

The present invention additionally provides a method of making a composite material for a vacuum cleaner filter bag, comprising the following steps:

providing a first layer consisting of a netting or a perforated sheet with an air permeability of at least 10,000 l/(m² s);

providing, on one side of the first layer, a first fibre layer consisting of man-made fibres and/or vegetable fibres, connecting said first layer to said first fibre layer.

The above method can especially be used for producing one of the above-described composite materials and, consequently, also one of the above-described vacuum cleaner filter bags.

The connection can be established especially in the form of a full-area connection. The connecting step can be executed as a thermal step. It can, in principle, be carried out such that a connection is established pointwise or areawise. In particular, it can be carried out by a smooth calender roller or by means of a ribbon calender. The connection step can therefore comprise the step of passing the layers through smooth calender rollers or a ribbon calender.

The steps of providing can be carried out by depositing the first layer on the first fibre layer or by depositing the first fibre layer on the first layer.

The first layer and/or the first fibre layer can have the properties and parameters described hereinbefore in connection with the composite material. The netting may be e.g. an extruded netting or a woven netting. The first fibre layer may especially be a non-woven layer.

In the case of the above-mentioned method, the first layer can be provided as a layer having a mass per unit area of 5 to 30 g/m², in particular of 7 to 20 g/m², and/or a thickness of 0.1 to 1.5 mm, in particular of 0.2 to 0.6 mm.

The first layer can be provided as a layer having an average hole cross-sectional area of 2 to 900 mm², in particular of 5 to 50 mm², and/or an air permeability of at least 11,000 l/(m² s), in particular of at least 13,000 l/(m² s), in particular of at least 15,000 l/(m² s). The first fibre layer can comprise fibres with a maximum fineness of 5 dtex, in particular of 3 dtex. The first layer can be a netting having a mesh opening of 2 mm to 30 mm.

The above described methods can additionally comprise the step of providing a second fibre layer consisting of man-made fibres and/or vegetable fibres. The second fibre layer can, in particular, be provided on the side of the first layer facing away from the first fibre layer. The step of connecting may comprise connecting the second fibre layer to the first layer, especially on the side facing away from the first fibre layer. In particular, both fibre layers can be connected simultaneously to the first layer and/or to one another. This means that the provision of the two fibre layers and of the first layer can take place prior to the connecting step. The connecting step can be executed such that fibres of the first and of the second fibre layer are connected to one another in the meshes or pores of the first layer.

The connection can be established such that the first layer is fully enclosed by fibres of the first and/or second fibre layer(s).

In the case of the above-mentioned methods, the connecting step can be executed as a thermal step, in particular by means of calendering, and/or by means of an adhesive. The thermal bond is, by way of example, established either due to the fact that the netting comprises a bicomponent material or the staple fibres comprise bicomponent fibres and/or fusing fibres, and/or by spraying on e.g. a hotmelt for the purpose of connection or by dispersing or interspersing a hotmelt powder. Other connection methods may be used as well.

The second fibre layer can have the properties and parameters described hereinbefore in connection with the composite material. The first and/or the second fibre layer may each consist of a dry-laid or wet-laid non-woven layer or of an extruded non-woven layer. The first and/or the second fibre layer can especially be a staple fibre layer, in particular a carded staple fibre layer.

As has already been described hereinbefore, also materials having the above-mentioned material parameters can be used for the fibre layers and the first layer.

The present invention also provides a composite material that can be obtained by means of the above described methods.

The present invention additionally provides a method of producing a vacuum cleaner filter bag, comprising producing a composite material according to one of the above described methods and assembling the composite material so as to obtain a vacuum cleaner filter bag.

Prior to the assembling step, at least one filter layer can additionally be provided. This can be followed by a step of connecting the at least one filter layer to the composite material prior to the assembling step.

The present invention additionally provides a vacuum cleaner filter bag that can be obtained by the above described methods.

In the following, the invention will be described in more detail making reference to examples and to the figures, in which FIG. 1 shows schematically the structural design of a first exemplary composite material;

For determining the various parameters, the methods described in the following are used. The air permeability is determined according to DIN EN ISO 9237: 1995-12. The device used was the air permeability tester FX3300 of the firm of Textest AG. In particular, a differential pressure of 200 Pa and a test area of 25 cm² were used employed.

The mass per unit area is determined according to DIN EN 29073-1: 1992-08. For determining the thickness, the method according to the standard DIN EN ISO 9073-2: 1997-02 is used, and method A is used for an extruded netting or a perforated sheet.

The average hole cross-sectional area is determined optically, e.g. by means of a measuring microscope or through image analysis, averaging being performed over at least 100 holes or pores, and the smallest cross-sectional area parallel to the base being taken into account for each hole.

The mesh opening is determined according to DIN ISO 9044 as a distance between two neighbouring bridges or threads in the projection plane and in the middle of the mesh.

The determination of the tensile strength and of the tensile strength elongation has been executed according to DIN EN 29073-3: 1992-08. For determining the fineness, DIN EN ISO 1973: 1995-12 has been taken as a basis.

Unless otherwise noted, the above-mentioned methods are also used for determining the respective parameters of extruded nettings or perforated sheets.

Figure 1:
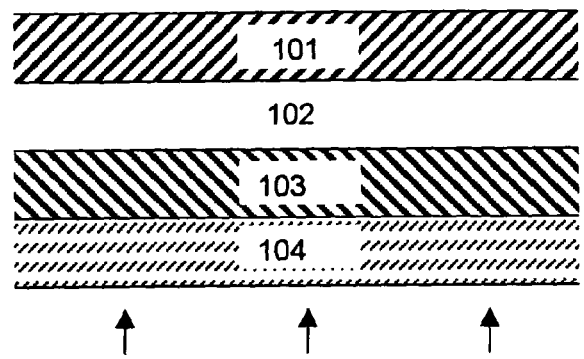

FIG. 1 shows schematically the structural design of an exemplary composite material. A first layer 101 is provided in the form of an extruded or woven netting or a perforated sheet. An extruded netting of the type in question can be produced e.g. according to DE 35 08 941.

Alternatively, it would be possible to use e.g. the nettings RO3650, RO5340 of the firm of Conwed or Thermanet RO3434. For example, the netting RO3650 has an air permeability which is higher than 15,000 l/(m² s), a mass per unit area of 10.54 g/m², a mesh opening of 4.2×4.2 mm and a thickness of 0.3 mm.

One example of a suitable woven netting can be obtained under the number 3945/85 from the firm of Chavanoz Industrie. The air permeability is higher than 15,000 l/(m² s), the mass per unit area is 17 g/m² and the tensile strength lies at 50 N.

Other possible materials can be obtained from DelStar Technologies, Inc., e.g. the perforated sheet X220NAT which has an air permeability of 10500 l/(m² s), a thickness of 0.26 mm, a mass per unit area of 26 g/m², a tensile strength of 60 N and a tensile strength elongation of 30%.

This first layer has connected thereto a first fibre layer 102. This fibre layer may especially include staple fibres or endless fibres or consist of these fibres. Possible fibres are e.g. monocomponent fibres consisting of polypropylene or polyester, or bicomponent fibres. In addition, the fibre layer 102 may also comprise fusing fibres for subsequent bonding to the first layer.

For producing a composite material according to FIG. 1, e.g. the first layer 101 can be deposited first, whereupon the first fibre layer 102 is deposited on said first layer 101. Alternatively, the first fibre layer 102 may be deposited first, and the first layer 101 is then deposited on said first fibre layer 102.

A connection between the first layer 101 and the first fibre layer 102 can be established in various ways. This connection can be fundamentally independent of the other layers of the composite material. The two layers may e.g. be thermally bonded, in particular by means of calendering. For this purpose, at least one of the two layers has a thermoplastic component. The first fibre layer may, by way of example, comprise thermoplastic fibres, e.g. in the form of bicomponent fibres and/or in the form of fusing fibres added thereto. Alternatively or additionally, the first layer may comprise a thermoplastic polymer; the first layer can e.g. be provided in the form of an extruded bicomponent netting. The calendering can be executed in particular areawise (with smooth rollers of with a ribbon calender). Due to the calendering, at least a few of the fibres of the first fibre layer are connected to the first layer.

The first layer 101 (e.g. a netting) can, by way of example, be deposited first. This first layer has then deposited thereon a first fibre layer 102 in the form of a non-woven layer consisting of staple fibres. Subsequently, the first layer and the first fibre layer are passed through a ribbon calender, whereby the fibres of the first fibre layer are thermally bonded to one another and to the first layer. In particular fibres of the first fibre layer project into the pores or holes of the first layer.

According to one variant, the first fibre layer 102 may, for example, be deposited first, whereupon an adhesive, e.g. a hotmelt, can be applied thereto by spraying. Subsequently, the first layer 101 is deposited and connected to the first fibre layer 102 by means of a ribbon calender so that a thermal bond will be established.

The second fibre layer 103 can then follow e.g. in the form of a meltblown layer. The second fibre layer 103 is connected to the first fibre layer 102 on the side facing away from the first layer 101. This connection can be established e.g. thermally (in particular through a ribbon calender).

A further fibre layer 104 can be provided additionally. This fibre layer can e.g. be a spunbond layer. Also the fibre layer 104 can be bonded to the other layers e.g. thermally or by means of ultrasonic welding.

When the composite material according to FIG. 1 is used for making therefrom a vacuum cleaner filter bag, the first layer 101 can be arranged as the outermost layer of the vacuum cleaner filter bag.

Hence, the first layer 101 is the furthest downstream layer with respect to the air current occurring in the operating condition, this being illustrated by the arrows in FIG. 1. Alternatively, the layers 101 and 102 may, however, also be interchanged, so that the first fibre layer 102 would then define the innermost layer, followed by the first layer 101, in the assembled vacuum cleaner filter bag. This has especially the advantage that the netting or the sheet 101 would be prevented from getting caught in the vacuum cleaner housing.

Figure 2:
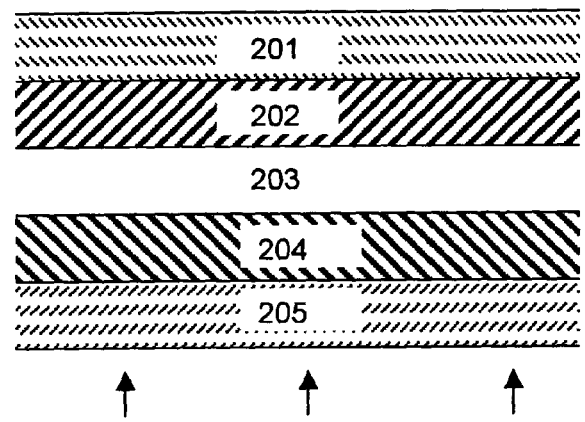
FIG. 2 shows schematically a second structural design of an exemplary composite material.
Figure 3:
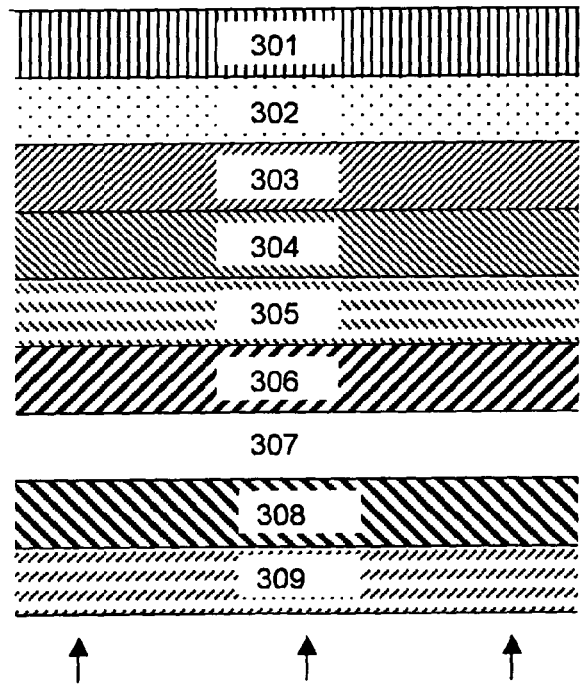
FIG. 3 shows schematically the structural design of a third exemplary composite material.

For the bag wall of a vacuum cleaner filter bag, the composite material shown in FIG. 1 has preferably added thereto additional layers of material, which are exemplarily shown in FIGS. 2 and 3.

FIG. 2 illustrates schematically a further example of a composite material structure. In the example shown, the first layer 202, which may e.g. be an extruded netting, is connected to a respective second fibre layer 201 and a respective third fibre layer 203 on both sides thereof. The production process can be so conceived that e.g. one of the two fibre layers is deposited first, whereupon the first layer 202 and, finally, the other fibre layer are deposited. The fibre layers can especially be carded non-wovens or extruded non-wovens, which may, however, comprise different fibres and have different parameters (such as mass per unit area and thickness). Alternatively, the two fibre layers may, however, also be identical. When these three layers have been deposited, a connection can be established e.g. by means of a ribbon calender, so that both fibre layers will be connected to the intermediate first layer.

These layers are followed, in the upstream direction, by a carded non-woven layer 204 and a layer 205 defined by an extruded netting or a perforated sheet. The meltblown layer can be implemented analogously to the example according to FIG. 1. In the example shown, the innermost layer 205 is defined by an extruded netting or a perforated sheet and fulfills primarily a stabilizing function. The non-woven layer 204 and the layer 205 may be connected e.g. by means of an engraved calender. A connection with the composite material comprising the layers 201, 202 and 203 can be established thermally with the aid of a hotmelt.

The composite materials shown in FIGS. 2 and 3 are suitable for defining the bag wall of a vacuum cleaner filter bag.

FIG. 3 shows schematically a further embodiment of a composite material. In the structure shown, both sides of an extruded netting 302 are provided with a respective non-woven layer 301 and 303 in the downstream direction. In a vacuum cleaner filter bag the non-woven layer 301 will define the outer layer. The non-woven layers 301 and 303 are connected to an extruded netting 302 by means of a ribbon calender. This composite material can be obtained in the way described hereinbelow.

Further upstream, two meltblown layers 304 and 305 are provided, which are followed by a non-woven layer 306 consisting of electrostatically charged staple fibres. The layers 304, 305 and 306 are connected to one another and to the first three layers through calendering, executed e.g. by means of an ultrasonic calender. In the upstream direction, these layers are followed by a laminate consisting of an extruded netting 308 provided with a respective carded staple fibre layer 307 and 309 on both sides thereof.

A composite material consisting of the layers 301, 302 and 303, as shown in FIG. 3, comprises three layers. Two fibre layers are arranged on respective sides of a first layer in the form of a netting, so that the netting will be arranged between the two fibre layers. The fibre layers are non-woven layers made e.g. of staple fibres. In the production process, the netting is deposited between the two non-woven layers. For establishing a thermal bond, the fibre layers and/or the netting comprise one or a plurality of thermoplastic components. The netting, for example, may consist of a monocomponent material, whereas the two fibre layers may contain bicomponent fibres. Instead of the bicomponent fibres, the fibre layers may also comprise fusing fibres. Alternatively or additionally, the netting consists of a bicomponent material. According to another variant, an adhesive, such as a hotmelt, may be provided.

Subsequently, the three layers are passed through a ribbon calender so that an adhesive bond will be formed by means of the thermoplastic components. Through this adhesive bond, fibres within the respective fibre layers are bonded to one another, fibres of the two fibre layers are bonded to the netting, and fibres of one fibre layer are bonded to fibres of the other fibre layer. The latter is accomplished through the meshes or the pores of the netting, i.e. the fibres of the fibre layers project into the meshes of the netting and are bonded to one another therein. In this way, a very stable composite material is accomplished whose layers cannot be displaced relative to one another, and in which the netting is fully enclosed by the fibres of the two fibre layers.

It goes without saying that the layers referred to hereinbefore by way of example (e.g. layers consisting of a netting, a sheet, a web or a non-woven) may also be arranged and, if necessary, connected to one another in some other way. In addition, it goes without saying that the figures neither show the depicted layers with realistic dimensions nor do they reproduce the microscopic arrangement of the fibres of the various layers.

The invention claimed is:

1. A vacuum cleaner filter bag having a composite material comprising:
    a first layer consisting of a netting with an air permeability of more than 10,000 $l/(m^2 s)$, the netting having a mesh opening of 2 mm to 30 mm and a thickness of 0.1 to 1.5 mm; and
    a first fibre layer consisting of man-made fibres or vegetable fibres or man-made fibres and vegetable fibres and connected to one side of the first layer.

2. A vacuum cleaner filter bag according to claim 1, wherein the netting is an extruded netting or a woven netting.

3. A vacuum cleaner filter bag according to claim 1, wherein the first layer has a mass per unit area of 5 to 30 $g/m^2$.

4. A vacuum cleaner filter bag according to claim 1, wherein the first layer has an average hole cross-sectional area of 2 to 900 $mm^2$ or an air permeability of at least 11,000 $l/(m^2 s)$.

5. A vacuum cleaner filter bag according to claim 1, wherein the first layer has a tensile strength in the machine direction or in the cross direction of 30 to 200 N or a tensile strength elongation in the machine direction or in the cross direction of 10 to 70%.

6. A vacuum cleaner filter bag according to claim 1, wherein the first fibre layer comprises fibres having a maximum fineness of 5 dtex.

7. A vacuum cleaner filter bag according to claim 1, wherein the composite material comprises a second fibre layer made of man-made fibres or vegetable fibres or man-made fibres and vegetable fibres, said second fibre layer being connected to the first layer on the side facing away from the first fibre layer.

8. A vacuum cleaner filter bag according to claim 1, wherein the first or a second fibre layer is thermally bonded to the first layer.

9. A vacuum cleaner filter bag according to claim 1, wherein the first or a second fibre layer comprises a non-woven layer.

10. A vacuum cleaner filter bag according to claim 1, wherein the first or a second fibre layer comprises a non-woven layer consisting of staple fibres.

11. A vacuum cleaner filter bag according to claim 1, wherein the first or a second fibre layer is a dry-laid or wet-laid non-woven layer or an extruded non-woven layer.

12. A vacuum cleaner filter bag according to claim 1, wherein the first fibre layer or a second fibre layer has a mass per unit area of 5 to 60 $g/m^2$.

13. A vacuum cleaner filter bag according to claim 1, wherein the composite consisting of the first layer and the first fibre layer, or of the first layer, the first fibre layer and the second fibre layer, has an air permeability of 2,000 to 12,000 $l/(m^2 s)$.

14. A vacuum cleaner filter bag according to claim 1, wherein the first layer, the first fibre layer or a second fibre layer define the outermost layer of a bag wall.

15. A method of making a composite material for a vacuum cleaner filter bag, comprising the following steps:
    providing a first layer consisting of a netting with an air permeability of more than 10,000 $l/(m^2 s)$, the netting having a mesh opening of 2 mm to 30 mm and a thickness of 0.1 to 1.5 mm;
    providing, on one side of the first layer, a first fibre layer consisting of man-made fibres or vegetable fibres or man-made fibres and vegetable fibres, and
    connecting said first layer to said first fibre layer.

16. A method according to claim 15, wherein the connecting step is executed thermally.

17. A method according to claim 15, comprising depositing the first layer on the first fibre layer, or depositing the first fibre layer on the first layer.

18. A method according to claim 15, wherein the netting is an extruded netting or a woven netting.

19. A method according to claim 15, comprising providing the first layer as a layer having a mass per unit area of 5 to 30 $g/m^2$.

20. A method according to claim 15, comprising providing the first layer as a layer having an average hole cross-sectional area of 2 to 900 $mm^2$ or an air permeability of at least 11,000 $l/(m^2 s)$.

21. A method according to claim 15, comprising providing the first layer having a tensile strength in the machine direction or in the cross direction of 30 to 200 N or a tensile strength elongation in the machine direction or in the cross direction of 10 to 70%.

22. A method according to claim 15 comprising providing the first fibre layer comprising fibres having a maximum fineness of 5 dtex.

23. A method according to claim 15, further comprising the step of providing a second fibre layer, and wherein the connecting step comprises connecting said second fibre layer to the first layer on the side facing away from the first fibre layer.

24. A method according to 16, wherein the connecting step is executed thermally by means of calendering, or by means of an adhesive.

* * * * *